United States Patent
Hunyadi Murph et al.

(10) Patent No.: US 12,325,073 B2
(45) Date of Patent: Jun. 10, 2025

(54) STRUCTURAL VEHICLE COMPONENTS FOR HYDROGEN STORAGE

(71) Applicant: SAVANNAH RIVER NUCLEAR SOLUTIONS, LLC, Aiken, SC (US)

(72) Inventors: Simona E. Hunyadi Murph, North Augusta, SC (US); Henry T. Sessions, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 922 days.

(21) Appl. No.: 16/822,634

(22) Filed: Mar. 18, 2020

(65) Prior Publication Data

US 2021/0291267 A1 Sep. 23, 2021

(51) Int. Cl.
*B22F 3/11* (2006.01)
*B29C 64/153* (2017.01)
(Continued)

(52) U.S. Cl.
CPC .......... *B22F 3/1125* (2013.01); *B29C 64/153* (2017.08); *B64D 37/30* (2013.01);
(Continued)

(58) Field of Classification Search
CPC ......... B22F 3/1125; B64D 37/30; C22C 1/08; H01M 8/04201; H01M 2250/20;
(Continued)

(56) References Cited

U.S. PATENT DOCUMENTS 6,520,219 B2   2/2003  Shapovalov et al.
6,852,273 B2 *  2/2005  Ivanov ............... C22C 1/047
                                                  419/48
(Continued)

FOREIGN PATENT DOCUMENTS

DE   102009034566       7/2009
GB      2584324 A  * 12/2020  ............ B60K 15/07
(Continued)

OTHER PUBLICATIONS

Andreasen, A. "Hydrogenation properties of Mg—Al alloys" *Int'l. J. Hydro. Ener.* 33 (2018) pp. 7497-7489.
(Continued)

*Primary Examiner* — Philip J Bonzell
(74) *Attorney, Agent, or Firm* — Dority & Manning, P.A.

(57) ABSTRACT

Vehicle structural components and additive manufacturing methods for forming the components are described. The structural components incorporate hydrogen storage materials for use in conjunction with hydrogen fuel cells in electric-powered vehicles such as unmanned aerial vehicles. The hydrogen storage materials can be in the form of a 3D printed metal foam that includes a metal hydride and an inert structural metal. The material can exhibit a very low weight density able to store hydrogen in a low pressure solid-state form at a high energy density. The structural components that carry the hydrogen storage materials can be exchangeable components of a vehicle, and the vehicle can be refueled by merely exchanging an exhausted component for a replacement component that is fully-charged with hydrogen.

19 Claims, 3 Drawing Sheets

(51) Int. Cl.

| | |
|---|---|
| *B64D 37/30* | (2006.01) |
| *B64U 50/19* | (2023.01) |
| *B64U 50/32* | (2023.01) |
| *C22C 1/08* | (2006.01) |
| *F17C 11/00* | (2006.01) |
| *F17C 13/08* | (2006.01) |
| *H01M 8/04082* | (2016.01) |
| *B22F 10/10* | (2021.01) |

(52) U.S. Cl.
CPC ............. *B64U 50/19* (2023.01); *B64U 50/32* (2023.01); *C22C 1/08* (2013.01); *F17C 11/005* (2013.01); *F17C 13/084* (2013.01); *H01M 8/04201* (2013.01); *B22F 10/10* (2021.01); *B22F 2301/052* (2013.01); *B22F 2301/205* (2013.01); *F17C 2221/012* (2013.01); *H01M 2250/20* (2013.01); *Y02E 60/32* (2013.01); *Y02E 60/50* (2013.01)

(58) Field of Classification Search
CPC .... F17C 2221/012; Y02E 60/32; Y02E 60/50; B64U 20/83; B64U 50/32; B64U 50/19; B64U 80/25
See application file for complete search history.

(56) References Cited

U.S. PATENT DOCUMENTS

| | | | | |
|---|---|---|---|---|
| 7,186,474 | B2* | 3/2007 | Jang | B01J 20/28021 |
| | | | | 428/34.1 |
| 7,198,867 | B2* | 4/2007 | Sanders | F17C 11/005 |
| | | | | 429/219 |
| 8,114,545 | B2 | 2/2012 | Eickhoff et al. | |
| 8,444,903 | B2 | 5/2013 | Lyons et al. | |
| 8,646,597 | B2 | 2/2014 | Yang et al. | |
| 8,690,985 | B2 | 4/2014 | Shinozawa et al. | |
| 8,790,839 | B2 | 7/2014 | Braithwaite et al. | |
| 8,940,083 | B2 | 1/2015 | De Rango et al. | |
| 8,985,319 | B2 | 3/2015 | Chaise et al. | |
| 9,006,137 | B2* | 4/2015 | Blaser | C01B 3/0084 |
| | | | | 502/417 |
| 9,295,958 | B2 | 3/2016 | Langan et al. | |
| 9,517,590 | B2 | 12/2016 | Dandaleix | |
| 9,640,821 | B2 | 5/2017 | Eickhoff et al. | |
| 9,705,145 | B2 | 7/2017 | Kmetich et al. | |
| 9,768,459 | B2 | 9/2017 | Thampan et al. | |
| 10,181,609 | B2 | 1/2019 | Eickhoff et al. | |
| 10,297,848 | B1 | 5/2019 | Graetz et al. | |
| 10,355,290 | B2 | 7/2019 | Eickhoff et al. | |
| 10,476,089 | B2 | 11/2019 | Mishler et al. | |
| 10,777,832 | B2* | 9/2020 | Zheng | H01M 8/04216 |
| 10,858,296 | B1* | 12/2020 | Myrick | C06B 45/04 |
| 2001/0039803 | A1* | 11/2001 | Stetson | F17C 7/00 |
| | | | | 206/0.7 |
| 2002/0073618 | A1* | 6/2002 | Ovshinsky | B82Y 30/00 |
| | | | | 75/610 |
| 2004/0101740 | A1* | 5/2004 | Sanders | H01M 50/70 |
| | | | | 429/444 |
| 2004/0146736 | A1* | 7/2004 | Ivanov | C22C 1/047 |
| | | | | 428/609 |
| 2006/0026900 | A1* | 2/2006 | Jang | H01M 8/0606 |
| | | | | 48/190 |
| 2006/0030483 | A1* | 2/2006 | Jang | F17C 11/005 |
| | | | | 502/414 |
| 2006/0051638 | A1* | 3/2006 | Gross | C01B 3/0005 |
| | | | | 429/421 |
| 2006/0063003 | A1* | 3/2006 | Yang | C03C 4/082 |
| | | | | 428/406 |
| 2012/0282535 | A1 | 11/2012 | Fabian et al. | |
| 2014/0332711 | A1* | 11/2014 | Blaser | C01B 3/0084 |
| | | | | 252/75 |
| 2014/0360891 | A1 | 12/2014 | Kline et al. | |
| 2015/0093629 | A1* | 4/2015 | Sayre | H01M 50/545 |
| | | | | 429/185 |
| 2016/0272489 | A1 | 9/2016 | Wang et al. | |
| 2017/0050376 | A1 | 2/2017 | Casellas et al. | |
| 2017/0200961 | A1* | 7/2017 | Zheng | B64U 50/32 |
| 2018/0273194 | A1* | 9/2018 | Edgar | B64C 39/024 |
| 2019/0348695 | A1 | 11/2019 | Stimits et al. | |
| 2020/0313209 | A1* | 10/2020 | Rainville | H01M 8/04089 |
| 2020/0335806 | A1* | 10/2020 | Zheng | H01M 8/04156 |
| 2022/0041299 | A1* | 2/2022 | Wankewycz | B64D 27/24 |
| 2022/0250762 | A1* | 8/2022 | Sperrin | B60L 53/54 |

FOREIGN PATENT DOCUMENTS

| | | | | |
|---|---|---|---|---|
| WO | WO-9635079 | A1 * | 11/1996 | ............. F25B 17/12 |
| WO | WO 2014/135790 | | 9/2014 | |
| WO | WO 2018/046990 | | 3/2018 | |
| WO | WO-2018046990 | A1 * | 3/2018 | |
| WO | WO 2018/158203 | | 9/2018 | |
| WO | WO 2019/081755 | | 5/2019 | |

OTHER PUBLICATIONS

Ardica. "Alane—Aluminum Hydride for Fuel Cell Power" *NDIA* (2017) pp. 1-20.
Braithwaite, et al. "Recent Achievements with Alane (Aluminum Hydride, $AlH_3$) and Fuel Cell Power Systems" 14-2 (2018) pp. 242-245.
Buj-Corral, et al. "3D printing of porous scaffolds with controlled porosity and pore size values" *Materials* 11:1532 (2018) pp. 1-18.
Caputo, et al. "4D printing of net shape parts made from Ni—Mn—Ga magnetic shape-memory alloys" *Add. Manufact.* 21 (2018) pp. 579-588.
Chen, et al. "Improved kinetics of nanoparticle-decorated Mg—Ti—Zr nanocomposite for hydrogen storage at moderate temperatures" *Mater. Chem. Phys.* 206 (2018) pp. 21-28.
De Jongh, et al. "Nanosizing and nanoconfinement: new strategies towards meeting hydrogen storage goals" *Chem. Sus. Chem.* 3 (2010) pp. 1332-1348.
Dietrich, et al. "Hydrogen sorption and desorption kinetics and hydrogenation stability of Mg-metal-hydride thin films" *Sens. Act. A* 206 (2014) pp. 127-131.
Donateo, et al. "A new approach to calculating endurance in electric flight and comparing fuel cells and batteries" *Appl. Ener.* 187 (2017) pp. 807-819.
Dutczak, J. "Issues related to fuel cells application to small drones propulsion" *IOP Conf. Ser.: Mater. Sci. Eng.* 421:042014 (2018) pp.
Dutczak, J. "Liquefied and chemical hydrogen storage in contemporary small drones' fuel cell propulsion systems" *IOP Conf. Ser.: Mater. Sci. Eng.* 421:042015 (2018) pp. 1-10.
Edalati, et al. "Design and synthesis of a magnesium alloy for room temperature hydrogen storage" *Acta Mater.* 149 (2018) pp. 88-96.
EnergyOr. "EnergyOr fuel cell multirotor drone in 2 h flight with camera" *Fuel Cells Bull.* 2 (2016) pp. 3-4.
Gautam, et al. "A room temperature hydrogen sensor based on Pd—Mg alloy and multilayers prepared by magnetron sputtering" *Int'l J. Hydro. Ener.* 40 (2015) pp. 15549-15555. (Abstract only).
Ge, et al. "Multimaterial 4D printing with tailorable shape memory polymers" *Sci. Rep.* 6:31110 (2016) pp. 1-11.
Gertler, J. "US unmanned aerial systems" *Congr. Res. Serv.* R42136 (2012) pp. 1-55.
Gutowska, A. "Nanoscaffold mediates hydrogen release and the reactivity of ammonia borane" *Angew. Chem. Int. Ed.* 44 (2005) pp. 3578-3582.
Hanada, et al. "Catalytic Effect of Nanoparticle 3D-Transition Metals on Hydrogen Storage Properties in Magnesium Hydride $MgH_2$ Prepared by Mechanical Milling" *J. Phys. Chem. B* 109 (2005) pp. 7188-7194. (Abstract only).
Hassanalian, et al. "Classifications, applications, and design challenges of drones: A review" *Prog. Aerosp. Sci.* 91 (2017) pp. 99-131.
Jain, et al. "Hydrogen storage in Mg: A most promising material" *Int'l J. Hydrog. Ener.* 35 (2010) pp. 5133-5144.

(56) References Cited

OTHER PUBLICATIONS

Jeon, et al. "Air-stable magnesium nanocomposites provide rapid and high-capacity hydrogen storage without using heavy-metal catalysts" *Nat. Mater.* 10 (2011) pp. 286-290.
Jurczyk, et al. "Nanoscale Mg-based materials for hydrogen storage" *Int'l J. Hydrog. Ener.* 33 (2008) pp. 374-380.
Kazemi, et al. "Atomistic Study of the Effect of Magnesium Dopants on the Strength of Nanocrystalline Aluminum" *JOM* 71 (2019) pp. 1209-1214.
Klippstein, H. "Fused deposition modeling for unmanned aerial vehicles (UAVs): a review" *Adv. Eng. Mater.* 20:1700552 (2018) pp. 1-17.
Kuang, et al. "Advances in 4D printing: Materials and applications" *Adv. Funct. Mater.* 29:1805290 (2019) pp. 1-23.
Kumar, V. "Hydrogen absorption/desorption characteristics of room temperature $ZrMn_2—_xNi_x$ system (x= 1•25-1•50)" *Bull. Mater. Sci.* 37 (2014) pp. 655-660.
Kwon, et al. "Improvement of hydrogen-storage properties of Mg by reactive mechanical grinding with $Fe_2O_3$" *J. Alloy. Compd.* 396 (2005) pp. 264-268.
Lee, et al. "Two-way 4D printing: A review on the reversibility of 3D-printed shape memory materials" *Engineering* 3 (2017) pp. 663-674.
Li, et al. "Effect of aging treatment on the microstructure and mechanical properties of Al-3.02 Mg-0.2 Sc-0.1 Zr alloy printed by selective laser melting" *Mater. Des.* 168:107668 (2019).
Li, et al. "Magnesium nanowires: enhanced kinetics for hydrogen absorption and desorption" *J. Am. Chem. Soc.* 129 (2007) pp. 6710-6711.
Liu, et al. "Tuning the Thermodynamic Properties of $MgH_2$ at the Nanoscale via a Catalyst or Destabilizing Element Coating Strategy" *J. Phys. Chem. C* 118 (2014) pp. 27781-27792. (Abstract only).
Lu, et al. "Synthesis and hydrogen storage properties of core-shell structured binary Mg@Ti and ternary Mg@Ti@Ni composites" *Int'l J. Hydr. Ener.* 42 (2017) pp. 2239-2247.
Lu, et al. "Hydrogenation of Nanocrystalline Mg at Room Temperature in the Presence of $TiH_2$" *J. Am. Chem Soc.* 132 (2010) pp. 6616-6617. (Abstract only).
Mason, S.A. "Thinking Drones" *HRL Horiz.* 1 (2016) pp. 8-13.
Mitchell, et al. "Additive manufacturing—A review of 4D printing and future applications" *Add. Manuf.* 24 (2018) pp. 606-626.
Momeni, F. "A review of 4D printing" *Mater. Des.* 122 (2017) pp. 42-79.
Nowak, et al. "Mg-based nanocomposites for room temperature hydrogen storage" *Phys. Stat. Solidi A* 207 (2010) pp. 1144-1147.
Pan, et al. "Recent advances in fuel cells based propulsion systems for unmanned aerial vehicles" *Appl. Ener.* 240 (2019) pp. 473-485. (Abstract only).
Pukazhselvan, et al. "Role of chemical interaction between MgH2 and $TiO_2$ additive on the hydrogen storage behavior of $MgH_2$" *Appl. Surf. Sci.* 420 (2017) pp. 740-745.

Schimmel, et al. "Hydrogen cycling of niobium and vanadium catalyzed nanostructured magnesium" *J. Am. Chem. Soc.* 127 (2005) pp. 14348-14354.
Schneemann, et al. "Nanostructured metal hydrides for hydrogen storage" *Chem. Rev.* 118 (2018) pp. 10775-10839.
Silva, et al. "Room temperature hydrogen absorption by Mg and MgTiFe nanocomposites processed by high-energy ball milling" *Int'l J. Hydro. Ener.* 42 (2018) pp. 12251-12259.
Sterl, et al. "Magnesium as novel material for active plasmonics in the visible wavelength range" *Nano Lett.* 15 (2015) pp. 7949-7955.
Sun, et al. "Tailoring magnesium based materials for hydrogen storage through synthesis: Current state of the art" *Ener. Stor. Mater.* 10 (2018) pp. 168-198.
Sunandana, C.S. "Nanomaterials for hydrogen storage" *Resonance* 12 (2007) pp. 31-36.
Tasevski, S. "Liquified and Chemical Hydrogen Storage in UAV Fuel Cells" dronebelow.com (2018) pp. 1-3.
Usdod. "FY2009-2034 Unmanned Systems Integrated Roadmap" *Ofc. Sec. Def.* (2009) pp. 1-211.
Wang, et al. "Efficient pH-gradient-enabled microscale bipolar interfaces in direct borohydride fuel cells" *Nat. Ener.* 4 (2019) pp. 281-289.
Wang, et al. "Hydrogenation characteristics of Mg—$TiO_2$ (rutile) composite" *J. Alloy. Comp.* 313 (2000) pp. 218-223.
Wei, et al. "Direct-write fabrication of 4D active shape-changing structures based on a shape memory polymer and its nanocomposite" *ACS Appl. Mater. Interf.* 9 (2017) pp. 876-883.
Xie, et al. "Superior hydrogen storage kinetics of $MgH_2$ nanoparticles doped with $TiF_3$," *Acta Mater.* 55 (2007) pp. 4585-4591.
Xu, et al. "Improving hydrogen storage/release properties of magnesium with nano-sized metal catalysts as measured by tapered element oscillating microbalance" *Appl. Catal. A* 300 (2006) pp. 130-138.
Yang, et al. "4D printing reconfigurable, deployable and mechanically tunable metamaterials" *Mater. Horiz.* 6 (2019) pp. 1244-1250.
Yu, et al. "Size-dependent mechanical properties of Mg nanoparticles used for hydrogen storage" *Appl. Phys. Lett.* 106:261903 (2015) pp. 1-5.
Zaluski, et al. "Hydrogen absorption in nanocrystalline $Mg_2Ni$ formed by mechanical alloying" *J. Alloys Comp.* 217 (1995) pp. 245-249.
Zhang, et al. "State of the art multi-strategy improvement of Mg-based hydrides for hydrogen storage" *J. Alloys Comp.* 782 (2019) pp. 796-823.
Zhang, et al. "Selective laser melting of rare earth element Sc modified aluminum alloy: Thermodynamics of precipitation behavior and its influence on mechanical properties" *Add. Manuf.* 23 (2018) pp. 1-12.
Zhao, et al. "Ageing response of an Al—Mg—Mn—Sc—Zr alloy processed by laser metal deposition in thin-wall structures" *Vacuum* 158 (2018) pp. 121-125.
Zhao-Karger, et al. "Altered thermodynamic and kinetic properties of $MgH_2$ infiltrated in microporous scaffold" *Chem. Comm.* 46 (2010) pp. 8353-8355.

\* cited by examiner

STRUCTURAL VEHICLE COMPONENTS FOR HYDROGEN STORAGE

FEDERAL RESEARCH STATEMENT

This invention was made with Government support under Contract No. DE-AC09-08SR22470, awarded by the U.S. Department of Energy. The Government has certain rights in the invention.

BACKGROUND

Electric motors are highly beneficial for use in vehicles as they are two to three times more efficient than gas-powered internal combustion engines, they emit no undesirable emissions, and they are quiet and vibration free. Electric motors in vehicles are generally powered by batteries, but unfortunately, the weight and recharging times for batteries still limits broad adoption. Particularly in aerial vehicles, such as unmanned aerial vehicles (UAV), the weight and energy capacity of current energy storage devices, primarily lithium ion batteries, limits both flight time and payload.

Hydrogen fuel cells have been examined for use in powering the electric motors of vehicles. Hydrogen fuel cells can extend travel time between recharging as compared to electric motors powered with batteries, but still present significant issues. A major drawback to the wider utilization of hydrogen as a vehicle fuel remains the lack of acceptable hydrogen storage mediums. Conventionally, hydrogen has been stored in the gas phase under high pressure or in the liquid phase at extremely low temperatures. Unfortunately, high-pressure hydrogen storage vessels are bulky, heavy, and pose a safety concern, particularly if considered for use in vehicles, and low temperature liquid phase storage is even less feasible for use in electric-powered vehicles.

What are needed in the art are systems and methods that can be used to safely and efficiently store and release hydrogen to a hydrogen fuel cell as may be used to power an electric vehicle. A low pressure system that can store and release hydrogen without the weight and bulk necessitated by a high pressure gas storage tank would be highly beneficial, particularly for UAVs. The ability to quickly refuel the vehicle by quick and simple replacement of the hydrogen storage system would also be of great benefit in the art.

SUMMARY

According to one embodiment, disclosed is a structural component of a vehicle, the structural component including a hydrogen storage material. The hydrogen storage material includes an inert scaffolding metal, e.g., aluminum, and a metal hydride that can function as a hydrogen absorbing/releasing material, e.g., a magnesium-based hydride. The hydrogen storage material can optionally include dopants, catalysts, etc. that can control hydrogen uptake/release characteristics of the active material. In one embodiment, the hydrogen storage material can be in the form of a metal foam. The structural component can also include a casing surrounding the hydrogen storage material and an attachment that is configured to releasably attach the structural component to a vehicle such that upon attachment the hydrogen storage material is in fluid communication with a hydrogen fuel cell of the vehicle.

Also disclosed is a UAV incorporating a structural component as described. The UAV also includes a hydrogen fuel cell, a fluid connection between the hydrogen storage material and the hydrogen fuel cell upon attachment of the structural component to the UAV, and an electric motor in electrical communication with the hydrogen fuel cell. In addition, the UAV can include a control system configured to controllably release hydrogen from the hydrogen storage material and deliver the hydrogen to the hydrogen fuel cell via the fluid connection.

Also disclosed is a method for forming a structural component of a vehicle. For instance, a method can include depositing a metal powder, the metal powder including an inert metal and a metal hydride. The method can also include solidifying the metal powder to form a hydrogen storage material in the form of a metal foam. In one embodiment, the deposition and solidification steps can be according to an additive manufacturing process, e.g., a 3D printing process. A method can also include enclosing the metal foam in a casing, the casing having the shape of a structural component (or a portion of a structural component) of a vehicle.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
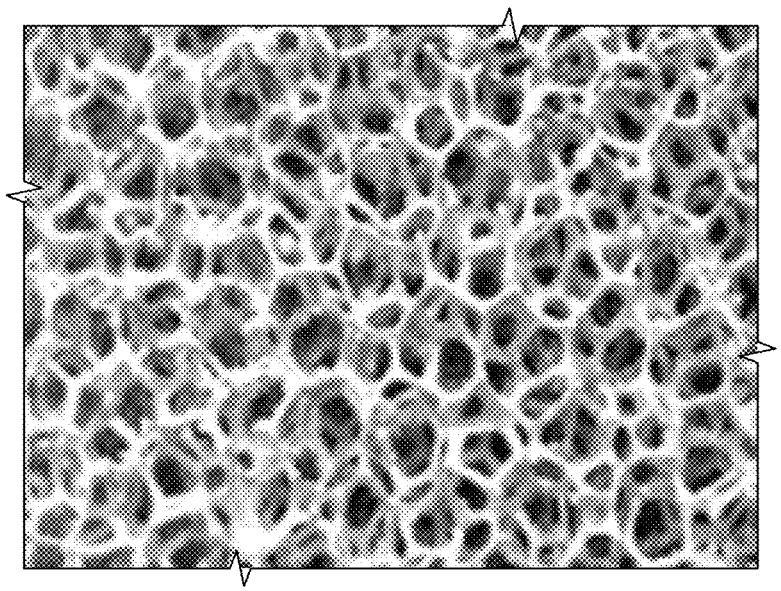
FIG. 1 is an image of a metal foam as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are structural components that incorporate hydrogen storage materials for use in conjunction with hydrogen fuel cells in electric-powered vehicles and in one particular embodiment, in UAVs. Also disclosed are additive manufacturing methods for forming the hydrogen storage materials and structural components incorporating the hydrogen storage materials. Disclosed structural components can have a very low weight density and can store hydrogen in a low pressure solid-state form at a high energy density. In addition, the structural components that can carry the hydrogen storage materials can be exchangeable components of a vehicle. As such, a vehicle can be refueled by merely exchanging an exhausted component for a replacement component that is fully-charged with hydrogen.

The structural components can eliminate the need for high pressure hydrogen storage tanks in a vehicle and can decrease the weight of the vehicle as compared to similar vehicles that utilize a traditional high pressure hydrogen storage tank, not only through the lack of a hydrogen storage tank, but also due to the low weight density of the structural component that carries the hydrogen storage material. Due to decreased weight density of the vehicle structure and increased energy density of the hydrogen storage materials, the operational time of a vehicle between fuel charges can be extended as compared to battery powered systems, which can be highly beneficial for aerial vehicles and UAVs in particular.

As utilized herein, the term "structural component" generally refers to a component of a vehicle that forms at least a portion of the body or frame of the vehicle, that carries a load of the vehicle, and/or that absorbs or transmits forces during operation of the vehicle. Thus, the structural components as described provide at least two functions to a vehicle, the structural aspect provided by the overall shape, strength, mechanical connections, etc. of the component, and the hydrogen storage aspect provided by the hydrogen storage material carried within a casing of the component.

The hydrogen storage materials provide for storage of hydrogen in the solid phase through inclusion of an active hydrogen absorbing/releasing material that can efficiently and reversibly form a metal hydride. The reversible storage of hydrogen in the hydride form can provide a greater volumetric storage density than hydrogen storage as a compressed gas or a liquid and can present fewer safety problems than hydrogen stored in a gas or a liquid phase, particularly as desorption can be well controlled. The hydrogen storage materials can provide a high power density, e.g., about 0.5 watt-hour/gram (W-h/g) or higher and can do so at a low weight density, e.g., about 3 gram/cubic centimeter (g/cc) or less; for instance, from about 1 g/cc to about 3 g/cc, or from about 1.7 g/cc to about 2.7 g/cc in some embodiments.

The hydrogen storage material of the structural component can absorb and release hydrogen through reversible formation of a metal hydride bond according to an interstitial hydride formation. Interstitial hydrides are traditionally termed 'metal hydride compounds' even though they do not strictly conform to the definition of a compound. They more closely resemble alloys such as steel, and as such, are commonly described as incorporating the hydrogen via 'metal bonding.' In interstitial metal hydrides, hydrogen can exist as either an atomic or diatomic entity and the hydride is formed by the absorption and insertion of hydrogen into the crystal lattice of the metal, metal alloy, or a phase of the metal alloy. The interstitial hydride systems can be non-stoichiometric and able to incorporate variable amounts of hydrogen atoms in the lattice, and as such, their absorption capacity can vary greatly between materials and conditions.

In one embodiment, the hydrogen storage materials can incorporate metals or metal alloys having a relatively high strength-to-weight ratio, particularly when considering formation of structural components for use in aircraft applications.

The hydrogen storage material can include as the active hydrogen absorbing/releasing material any metal hydride or metal alloy hydride capable of reversibly storing hydrogen. By way of example, the hydrogen storage material can include, without limitation, an element chosen from Group IA alkali metals, Group IIA alkali earth metals, Group IIIB lanthanides, or Group IVB transition metals. In one embodiment, the hydrogen storage material can include a transition metal capable of forming a reversible binary metal hydride including, without limitation, palladium, titanium, zirconium, hafnium, zinc, and/or vanadium.

Multi-component metal alloys are also encompassed as active hydrogen absorbing/releasing materials and can include, without limitation, combinations of Group IV elements with Group V through Group XI elements (based on the 1990 IUPAC system in which the columns are assigned the numbers 1 to 18), as well as alloys including combinations of lanthanides (atomic numbers 58 to 71) with Group VII through Group XI elements. For example, the active hydrogen absorbing/releasing material can have the structure $A_xT_y$, in which A can be one or more Group IV elements and T can be one or more Group V through Group XI elements. In some embodiments, a Group VI metal can be selected from Mo and W, and a Group VIII metal can be selected from Fe, Co, Ni, Pd, and Pt. In some embodiments, a Group VI metal can be Mo and a Group VIII metal can be selected from Co and Ni.

In another embodiment, an active hydrogen absorbing/releasing material can have a compositional formula of

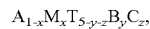

$$A_{1-x}M_xT_{5-y-z}B_yC_z,$$

wherein:
A=is an alloy of rare earth elements, typically including cerium and lanthanum;
M=La, Pr, Nd or Ce;
T=Ni;
B=Co;
C=Mn, Al or Cr;
x=0.0 to 1.0;
y=0.0 to 2.5; and
z=0.0 to 1.0.

The hydrogen storage material can be selected to have a desired lattice structure and thermodynamic properties so as to control the pressure and/or temperature at which hydrogen is absorbed and desorbed. Such working thermodynamic parameters can be modified and fine-tuned by an appropriate alloying method according to known methodologies.

In one embodiment, the hydrogen storage material can include a magnesium-based active material, i.e., magnesium hydride or a magnesium alloy hydride. Magnesium can exhibit a high theoretical gravimetric hydrogen density of about 7.6 wt. %, can reversibly bind hydrogen, and is abundant and available at relatively low cost. While the rate of hydrogen absorption can be slow at moderate temperatures (about 200° C. to about 300° C.), and magnesium-based materials can require rather high temperatures (greater than about 400° C.) to achieve complete conversion to magnesium hydride at a reasonable rate, such issues can be of little or no detraction in disclosed materials, as the exchangeable structural components can be hydrogenated after removal from a vehicle, and a vehicle can thus remain in service by sequentially using multiple exchangeable components.

The hydrogen storage material can include one or more additives that can improve desirable characteristics of the material, e.g., thermodynamic characteristics, kinetic characteristics, hydrogen absorption density, power density, activation energy, heat transfer, strength characteristics, etc. For example, additives that can be incorporated in a magnesium-based hydrogen storage material can include, without limitation, palladium, titanium, titanium oxide, titanium fluoride, scandium, zirconium, nickel, cobalt, manganese, iron, vanadium, silicon, iron oxide, platinum, ruthenium, or combinations of additives. When included, additives can generally be present in the hydrogen storage materials in a total additive amount of up to about 10 wt. % of the material.

In addition to an active hydrogen absorbing/releasing material, e.g., a magnesium-based hydride, a hydrogen storage material can include an inert scaffolding metal. The inert scaffolding metal can exhibit a high strength to weight ratio (e.g., about 100 kN-m/kg or greater) and can be inert in that it can exhibit little or no absorption of hydrogen. By way of example, the inert scaffolding material can include aluminum, titanium, etc. The hydrogen storage material can generally include the inert scaffolding material in an amount of about 5 wt. % to about 25 wt. %, for instance about 15 wt. % in some embodiments. The inert scaffolding material can provide strength to the hydrogen storage material and can also be utilized in design and control of other characteristics of the material. For instance, a magnesium composition including about 15 wt. % of aluminum can exhibit a binding energy to hydrogen of about 0.25 eV, which is lower than that of magnesium alone and corresponds to release of 1 bar hydrogen gas at 100° C.

The various components of the hydrogen storage material, including the base hydrogen absorbing/releasing metal or metal alloy, any additives, and the inert structural metal, can be present in the bulk hydrogen storage material at nano- and/or micro-scales, e.g., as grains in the solid, which can improve the thermodynamic and kinetic response of the material as well as mechanical characteristics of the material. Incorporating components as micro- or nanostructures within the hydrogen storage material, particularly when the hydrogen storage material is in the form of a high surface area porous structure, can also provide the materials with good reversibility, thereby enabling repeated absorption-desorption cycles without significant loss of hydrogen storage capabilities. Good absorption/desorption kinetics are also beneficial to enable hydrogen to be absorbed/desorbed in a relatively short period of time.

For instance, when considering a magnesium-based hydrogen storage material, active magnesium or magnesium alloy hydrides and dopants present at a micro- or nanoscale can improve the structural stability of the solid material during cycling as well as the hydrogen storage kinetics of the solid material, as magnesium nanoparticles can segregate at grain boundaries of the bulk material. By way of example, coupling nanoparticles of magnesium with palladium, platinum, and/or ruthenium nanocatalysts in formation of a high surface area porous metal foam can improve the hydriding/dehydriding kinetics of the magnesium-based material as compared to larger bulk materials.

In one embodiment, a magnesium-based hydrogen storage material can include a titanium oxide additive. The addition of titanium dioxide nanoparticles to a magnesium based metal foam can improve hydrogenation performance of the hydrogen storage material through increased kinetics, lower working temperature, and excellent oxidation-resistance as compared to similar materials but for the addition of the titanium dioxide nanoparticles.

Similarly, inclusion of about 10 wt. % 5 μm iron oxide in a magnesium-based hydrogen storage material can increase the $H_2$ absorption rate as compared to a similar material but for the addition of the iron oxide by facilitating nucleation and defects on the surface of the magnesium-based material and thereby reducing the diffusion distances of hydrogen atoms in the materials.

The bulk form of the hydrogen storage materials in the structural component can be a high surface area porous structure, i.e., a metal foam. The metal foam can include a series of interconnected pores, with the pore sizes being at the microscale in one embodiment. The pores are not limited to any particular size and can be either regular or irregular in size. Porous hydrogen storage materials can be beneficial as they can increase the penetration depth of a hydride reaction within the material and can decrease the hydrogen absorption time. The pore size can be selected/tuned as desired to affect hydrogen storage capacity and kinetics, as well as thermal stability. For instance, formation of a hydrogen storage material with smaller pores can provide a material with larger surface areas of interaction at the gas/solid interface, but can also increase working pressure of the materials. While pore size is not particularly limited, in one embodiment, a hydrogen storage material can define pore sizes of from about 40 micrometers to about 500 micrometers.

One embodiment of a typical metal foam is illustrated in FIG. 1. A metal foam can exhibit relatively high porosity, e.g., about 75% to about 95% of the total volume of the metal foam can consist of the void. In addition, the metallic solid of a metal foam can provide strength and high surface area contact for absorption/desorption of hydrogen, while also containing components of the hydrogen storage material at the nano- or microscale. This can be particularly beneficial as hydride materials often decrepitate or break down into smaller particles under repetitive reaction cycles, and high recycle ability is desirable in order for the disclosed structural components to be long-life exchangeable and reusable vehicle components. The reduced dimensions of active components in a metal foam can also be advantageous as nanophase metal hydrides can gave enhanced kinetics for reversible hydrogen storage relative to bulk materials.

A porous hydrogen storage material can be formed according to any suitable formation process, e.g., any suitable metal foam formation process. In general, however, a formation process can be selected that can retain components of the material at a nano- or microscale in the formed porous product.

In one embodiment, a porous hydrogen storage material can be formed as a metal foam according to an additive manufacturing methodology, also referred to herein as a 3D printing methodology. According to a 3D printing approach, a metal foam can be built using iterative formation and solidification of individual layers of the hydrogen storage material. According to this approach, a mixture of particles can first be formed that includes the components of the hydrogen storage material in the desired amounts (e.g., from about 65 wt. % to about 95 wt. % Mg or Mg alloy, up to about 10 wt. % of one or more additives (e.g., $TiO_2$, $Fe_2O_3$), from about 5 wt. % to about 25 wt. % aluminum or titanium), with the particles being on the nanoscale, the microscale, or some combination thereof.

In one embodiment, a 3D printing approach can utilize selective laser sintering (SLS). In this approach, a layer of the particles can be deposited on a print bed. An individual particle layer can generally have a thickness on the order of about 100 micrometers; for instance, from about 20 μm to about 150 μm, though thinner or thicker layers can alternatively be utilized. A particle layer can be spread onto a print bed according to any manner well known to those skilled in the art by use of any of a variety of additive manufacturing machines as are readily available. For instance, a particle layer may be formed by depositing either dry particles or particles suspended in a volatile liquid onto a print bed. When used, a volatile liquid will generally be evaporated, at least partially, from a first layer before depositing a second layer thereon.

Following deposition of an individual layer, a computer-controlled laser can fuse the metal powder in selected areas of each layer. A computer, such as is used in computer assisted design (CAD) work, can control the laser and selective fusing according to a three dimensional (3D) computer model of the metal foam and two dimensional (2D) slices taken therethrough, as is well known to those skilled in the art. Following fusion of select areas of a first layer, a second layer can be applied to the previous layer, and the metal powder of that layer can be selectively sintered according to the computer model. The complete foam can then be built up, layer-by-layer. SLS processes and machines as are generally known in the art can be used, such as those available from Concept Laser, a division of GE Additive.

In one exemplary embodiment, a high powered (e.g., about 1000 W) laser (e.g., an Yb laser) having a focus diameter of from about 100 μm to about 500 μm can be used. A foam can generally be formed in an inert atmosphere at an elevated temperature of about 200° C.

A metal foam formation technique is not limited to SLS approaches, and other 3D printing techniques as are known in the art may alternatively be utilized including, without limitation, electron beam melting, laser blown powder deposition systems, or metal laser melting printing systems. For instance, in one embodiment, a formation approach can utilize a binder to form a green product followed by sintering of the entire green product at one time. According to such an approach, a computer-controlled deposition device can deposit a stream of liquid binder from one or more jets onto select areas of a first layer of particles according to a pattern dictated by the computer. Alternatively, the binder can be in the form of solid particles that can be deposited on a previously formed layer of metal particles in the desired pattern. Suitable binders can include organic materials (e.g., polymeric resins) that are soluble either in water or volatile organic solvents.

Following deposition of a binder layer in a predetermined pattern, a second layer of particles can be laid atop the first layer, and as with the first layer, a binder can be deposited in the predetermined pattern onto the second layer of particles. This process is repeated, over and over, layer after layer, until the green product is completed. The binder in one layer is at least partially hardened (e.g., dried or cured) before the next layer of particles is laid down. The green article may thereafter be heated for further drying/curing of the binder to provide the nascent metal foam with sufficient green strength for handling, and to permit separating of the loose, unbonded particles from the bonded particles without distorting or damaging the article. Thereafter, the article may further be heated to sinter or weld the particles together to form a finished metal foam.

A metal foam of the hydrogen storage material can exhibit a high gravimetric hydrogen density as well as a power density. For instance, a magnesium-based hydrogen storage material can exhibit a gravimetric hydrogen density of about 1 wt. % or greater; for instance, from about 2 wt. % to about 7 wt. % in some embodiments. In addition, a magnesium-based hydrogen storage material can exhibit a power density of about 0.6 W-h/g, or even higher in some embodiments; for instance, from about 0.65 W-h/g to about 1 W-h/g in some embodiments.

Figure 2:
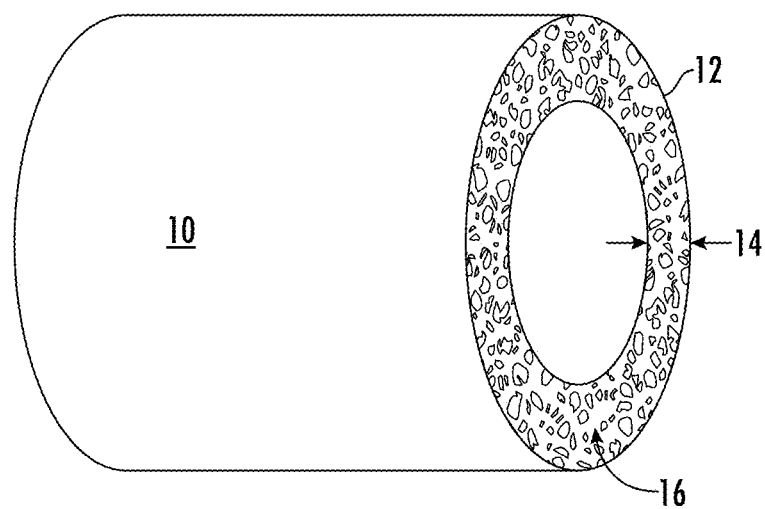
FIG. 2 schematically illustrates a structural component incorporating a metal foam as described.
Figure 3:
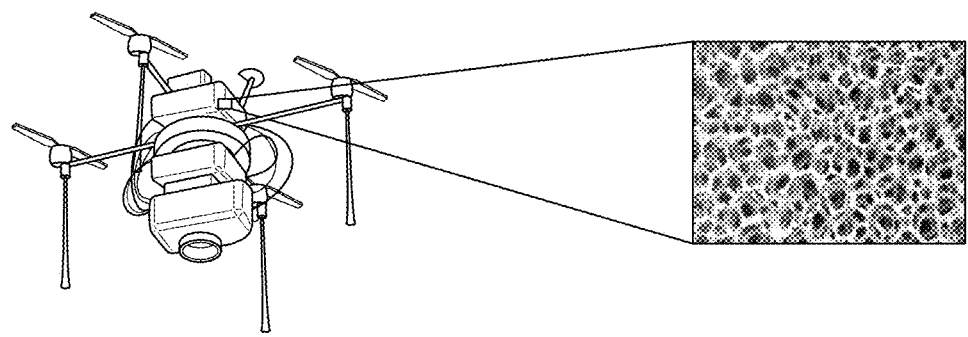
FIG. 3 illustrates one embodiment of a vehicle including a structural component that incorporates a metal foam as described.
Figure 4:
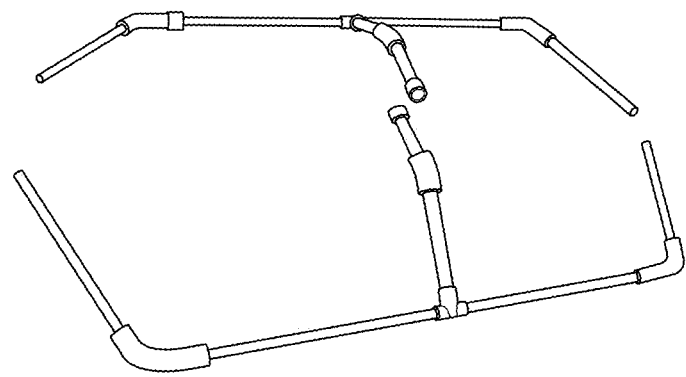
FIG. 4 illustrates one embodiment of a structural component of a vehicle that can incorporate a metal foam as described.
Figure 5:
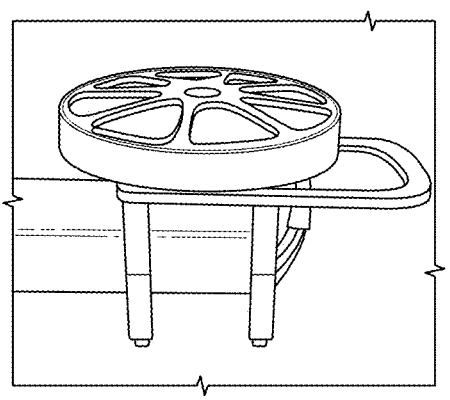
FIG. 5 illustrates another embodiment of a structural component of a vehicle that can incorporate a metal foam as described.

To form structural component of a vehicle, the porous hydrogen storage material can be surrounded by a casing of the desired shape and provided with suitable attachments, etc. for reversibly attaching the component to a vehicle and for placing the hydrogen storage material of the component in fluid communication with a hydrogen cell of the vehicle. For instance, FIG. 2 illustrates one example of a structural component 10 for a vehicle. In this embodiment, the structural component 10 is in the form of a cylindrical pipe, however, any suitable shape and size of a structural component is encompassed herein. As shown, the structural component 10 includes a cylindrical wall 12 having a thickness 14. Within the wall 12, the structural component 10 includes a metal foam 16 as described, i.e., a metal foam stored of a hydrogen storage material.

A structural component can generally be formed by locating a hydrogen storage material within a casing following formation of the hydrogen storage material. A casing can be formed of any suitable material that can retain the hydrogen storage material and hydrogen desorbed from the material during use at expected operating pressures, e.g., about 7 to about 10 psig. In one embodiment, a casing wall 12 can be formed of a light weight, high strength material, such as aluminum for example, that can provide desired mechanical characteristics to the structural component 10 while maintaining relatively low weight to improve operational capacity of the vehicle.

Figure 6:
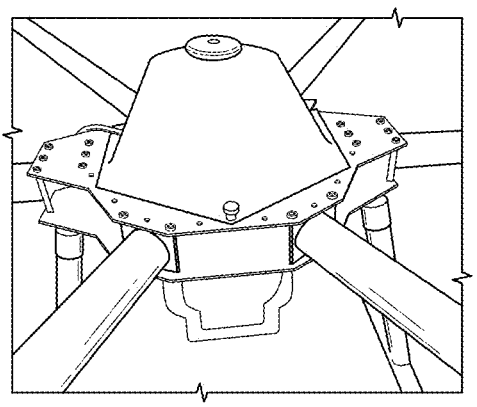
FIG. 6 illustrates another embodiment of a structural component of a vehicle that can incorporate a metal foam as described.

Any structural component that can be configured for exchange and placed in fluid communication with a hydrogen fuel cell can be formed to incorporate a hydrogen storage material as described. By way of example, FIGS. 3-6 illustrate several structural components of an UAV that can carry a hydrogen storage material including an UAV body (FIG. 3), landing gear (FIG. 4), motor supports (FIG. 5), and rotor mounts (FIG. 6). As an exchangeable component of a vehicle, a component could also include an attachment, e.g., a mounting clip, an alignment pin, a magnet, or the like, that can be used to locate and retain the component in place during use. Following use, a component can be simply removed from the remainder of the UAV and replaced with a fully charged component. The discharged hydrogen storage material of the removed structural component can then be recharged via, e.g., locating in a hydrogen atmosphere at a suitable temperature (e.g., about 200° C. or greater) until the hydrogen storage material is recharged with hydrogen.

Figure 7:
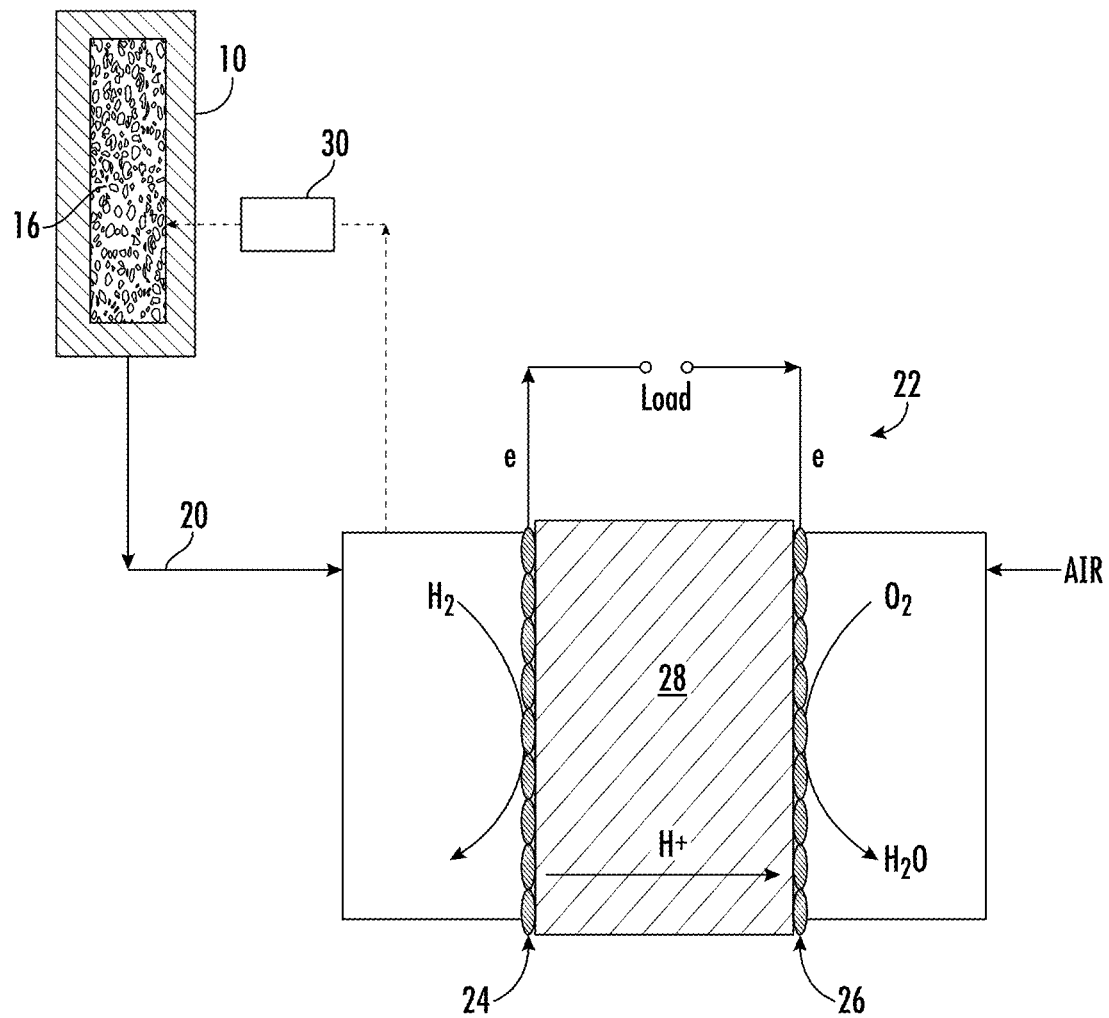
FIG. 7 schematically illustrates an electric motor vehicle power system as described herein.

FIG. 7 schematically illustrates a vehicle power system as may utilize a structural component as described. As shown, a structural component 10 can carry a hydrogen storage material 16 contained within the component 10. The structural component 10 can be located in the vehicle and placed in fluid communication via a fluid line 20 with a hydrogen fuel cell 22.

The hydrogen fuel cell 22 can be any suitable cell design and type. In general, a hydrogen fuel cell can include an anode 24 and a cathode 26 with an electrolyte 28 therebetween. The anode 24 receives hydrogen gas from the hydrogen storage material 16 and the cathode 26 receives oxygen or air, as shown. The hydrogen gas is dissociated at the anode 24 to generate free protons and electrons. The protons pass through the electrolyte 28 to the cathode 26, where they are reduced and react with oxygen to generate water. The electrons are directed from the anode through a load (e.g., the vehicle motor) to perform work before being sent to the cathode.

In one embodiment, a vehicle can incorporate a proton exchange membrane fuel cells (PEMFC). A PEMFC can include a solid polymer electrolyte proton conducting membrane, such as a perfluorosulfonic acid membrane. The anode and cathode typically include finely divided catalytic particles, for instance platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA).

A vehicle can include several individual fuel cells combined in a fuel cell stack to generate the desired power. For example, a typical fuel cell stack for a vehicle can include from one up to about two hundred or more stacked fuel cells. The fuel cell stack receives a cathode input reactant gas, typically a flow of air forced that, in some embodiments and depending upon the vehicle type, can be forced through the stack by a compressor. Not all of the oxygen is consumed by the stack and some of the air is output as a cathode exhaust gas that may include the water by-product. A fuel cell stack also receives the anode hydrogen reactant gas that flows into the anode side of the stack from the hydrogen storage material. In some embodiments, a fuel stack can also include cooling flow channels through which a cooling fluid can flow for temperature control.

As indicated in FIG. 7, a power system can also include a control system 30 that can be utilized to control the hydrogen desorption mechanism of the hydrogen storage material 16 and deliver hydrogen gas to the fuel cell 22. For instance, a control system 30 can use a feedback loop based upon the flow characteristics of hydrogen in the fluid line 20, the pressure of hydrogen gas at the anode 24, or any other suitable parameter to control the temperature of the hydrogen storage material 16 and thereby, to control the desorption characteristics of the hydrogen storage material.

While certain embodiments of the disclosed subject matter have been described using specific terms, such description is for illustrative purposes only, and it is to be understood that changes and variations may be made without departing from the spirit or scope of the subject matter.

What is claimed is:

1. A removably attachable structural component configured for attachment to a vehicle, the structural component comprising:
    a) a metal foam, the metal foam comprising sintered particles, the sintered particles comprising first particles including a metal hydride and second particles comprising an inert scaffolding material;
    b) a casing surrounding the metal foam;
    c) a fluid line in fluid communication with the metal foam; and
    d) an attachment device configured to retain the structural component in place during use and configured to release the structural component from the vehicle;
wherein the attachment device is configured such that upon the attachment and release, the metal foam is placed into and taken out of, respectively, fluid communication with a hydrogen fuel cell via the fluid line.

2. The structural component of claim 1, wherein the inert scaffolding metal comprises aluminum.

3. The structural component of claim 1, the casing comprising aluminum.

4. The structural component of claim 1, the metal foam having a weight density of 3 g/cc or less and/or a power density of 0.5 W-h/g or more.

5. The structural component of claim 1, wherein the first particles and the second particles are present in the metal foam as nano- or micro-scale particles.

6. A method for forming the structural component of claim 1, the method comprising:
    depositing a metal powder, the metal powder including the first particles and the second particles;
    sintering the first and second particles of the metal powder to form the metal foam; and
    surrounding the metal foam with the casing, the casing having a shape of a structural component of a vehicle or a portion thereof.

7. The structural component of claim 1, the metal foam comprising the inert scaffolding metal in an amount of 5 wt. % to 25 wt. % of the metal foam.

8. The structural component of claim 1, the metal foam defining a series of interconnected pores, the pores each having a pore size of from 40 micrometers to 500 micrometers.

9. The structural component of claim 1, the metal foam having a porosity of 75% to 95%.

10. The structural component of claim 1, the metal foam comprising the metal hydride in an amount from 65 wt. % to 95 wt. % of the metal foam.

11. The structural component of claim 1, the attachment device comprising a mounting clip, an alignment pin, or a magnet.

12. The structural component of claim 1, wherein the metal hydride comprises magnesium or a magnesium alloy.

13. The structural component of claim 12, the metal foam further comprising third particles comprising an additive, the additive comprising palladium, titanium, titanium oxide, titanium fluoride, scandium, zirconium, nickel, cobalt, manganese, iron, vanadium, silicon, iron oxide, platinum, ruthenium, or any combination thereof.

14. The structural component of claim 13, the metal foam comprising the additive in an amount of less than 10 wt. % of the metal foam.

15. An unmanned aerial vehicle comprising the structural component of claim 1, the unmanned aerial vehicle further comprising:
    a fluid connection between the fluid line that is in communication with the metal foam and the hydrogen fuel cell;
    a motor in electrical communication with the hydrogen fuel cell; and
    a control system configured to controllably release hydrogen from the metal hydride of the metal foam.

16. The unmanned aerial vehicle of claim 15, the vehicle comprising a body, the body comprising the structural component.

17. The unmanned aerial vehicle of claim 15, the vehicle comprising a landing gear, the landing gear comprising the structural component.

18. The unmanned aerial vehicle of claim 15, the vehicle comprising a motor support, the motor support comprising the structural component.

19. The unmanned aerial vehicle of claim 15, the vehicle comprising a rotor mount, the rotor mount comprising the structural component.

* * * * *